(12) United States Patent
Wauke

(10) Patent No.: US 6,770,998 B2
(45) Date of Patent: Aug. 3, 2004

(54) INNER-ROTOR MOTOR IMPLEMENTING ROTOR WITH EFFECTIVE DRIVE, AND DISK DRIVE USING THE SAME

(75) Inventor: Tomokuni Wauke, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 154 days.

(21) Appl. No.: 10/072,483

(22) Filed: Feb. 7, 2002

(65) Prior Publication Data

US 2002/0105244 A1 Aug. 8, 2002

(30) Foreign Application Priority Data

Feb. 23, 2001 (JP) ........................................ 2001-049348

(51) Int. Cl.[7] ................................................. H02K 3/00
(52) U.S. Cl. ..................... 310/179; 310/189; 310/200; 310/184
(58) Field of Search ................................ 310/179, 184, 310/187, 189, 198, 200, 218, 216, 217, 254

(56) References Cited

U.S. PATENT DOCUMENTS

| | | | | |
|---|---|---|---|---|
| 4,492,890 A | * | 1/1985 | MacDonald | 310/184 |
| 4,677,743 A | * | 7/1987 | Logie | 29/596 |
| 5,296,778 A | * | 3/1994 | Stroud | 310/68 D |
| 5,418,416 A | | 5/1995 | Muller | 310/186 |
| 5,723,931 A | * | 3/1998 | Andrey | 310/179 |
| 6,265,800 B1 | * | 7/2001 | Kimura et al. | 310/152 |
| 6,285,104 B1 | * | 9/2001 | Nashiki | 310/184 |

FOREIGN PATENT DOCUMENTS

JP          4-178161          6/1992

* cited by examiner

Primary Examiner—Burton S. Mullins
Assistant Examiner—Leda Pham
(74) Attorney, Agent, or Firm—Brinks Hofer Gilson & Lione

(57) ABSTRACT

The inner-rotor motor of the invention includes a rotor having plural magnetic poles disposed circumferentially, and a stator having a stator core with plural magnetic pole teeth facing to the rotor, located outside a circumference of the rotor, which have coils each wound around thereof. In this construction, the stator is placed within a central angel 180° with regard to a rotational center of the rotor, and the coils are set such that the numbers of turns of adjacent coils are unequal, and respective sums of the numbers of turns of the coils in respective phases are equal.

6 Claims, 10 Drawing Sheets

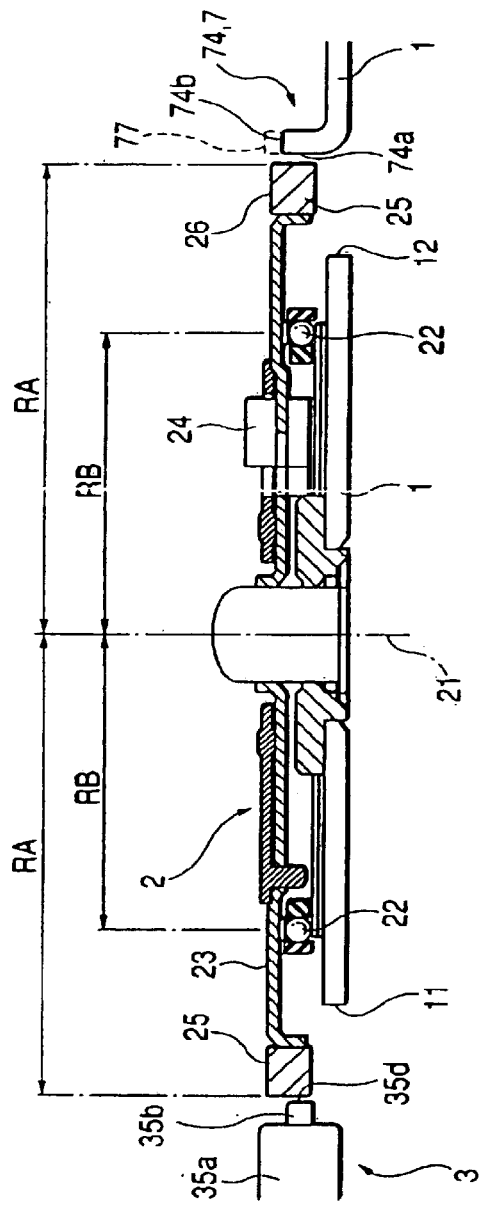
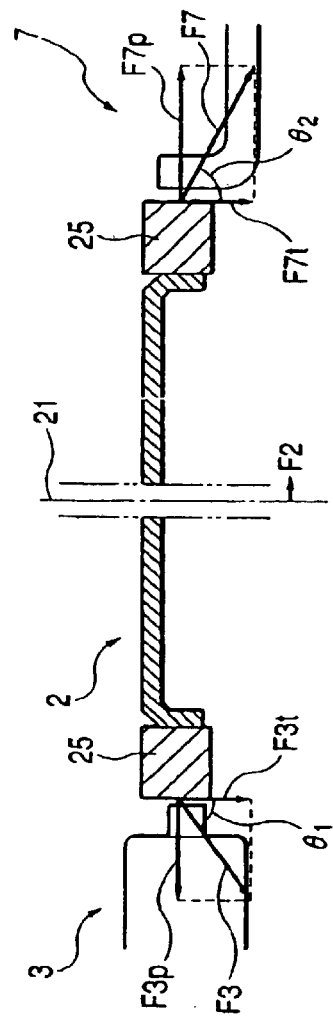
FIG. 2A
FIG. 2B

INNER-ROTOR MOTOR IMPLEMENTING ROTOR WITH EFFECTIVE DRIVE, AND DISK DRIVE USING THE SAME

BACKGROUND OF THE INVENTION

1. Field of the Invention

The present invention relates to a technique suitable for use in a thin-type inner-rotor motor for driving to rotate a media used in, for example, a floppy disk drive and so forth.

2. Description of the Related Art

The floppy disk drive and other disk drives are widely employed in the field from the personal computer to the office computer and the word processor, and so forth, which shows remarkable popularization. This type of disk drive is made up as shown in FIG. 10, for example.

This will be outlined on the basis of the drawing. In FIG. 10, the symbol 101 signifies a chassis, which possesses a spindle center 102 as the rotational center of a disk, which is housed in, for example, an equipment enclosure (not illustrated) of the personal computer. On the whole, the chassis opens to the front and to the upper, and is formed into a box with the bottom having a space to house a disk cartridge 103.

The chassis 101 has a stepping motor 124 for feeding a head carriage on the rear thereof, and the stepping motor 124 freely travels the head carriage forward backward. The head carriage holds a first head 130 on the front thereof, which reads information recorded on a disk. On the rear upper of the head carriage is attached a head arm 132 that freely swings through an elastic body, which has a second head 131 corresponding to the first head 130. The head arm 132 is energized in the direction that the second head 131 approaches to the first head 130. This type of disk drive is furnished with a cartridge holder 136 that holds the disk cartridge 103 to be freely pulled out, and a mechanism that opens and shuts the shutter of the disk cartridge 103.

Now, in order to satisfy the demand for a thinner type in recent years, this type of disk drive has been adopting one provided with an inner-rotor motor as illustrated in FIG. 11A and FIG. 11B as the motor for rotating a disk.

The inner-rotor motor is composed of a stator 164 and a rotor 166. The stator 164 has an annular yoke 161 extending circumferentially, and multiple cores 163 having coils 162 wound, which are provided radially on the inner periphery of the yoke 161. The rotor 166 has an annular magnet 165 installed to freely rotate on the inside of the stator 164, which faces to the cores 163. And, the symbol 168 denotes a circuit board on which is mounted a holder 170 incorporating bearings 169. The symbol 171 denotes a spindle for fixing the rotor that is pivoted to freely rotate through the bearings 169 on the holder 170 on the circuit board 168, which has the vertically extending axis. Further, the rotor 166 of this inner-rotor motor functions as a turntable having a disk chucking magnet (not illustrated) and a disk chucking swing lever (not illustrated).

In the stator for this type of inner-rotor motor, the yoke 161 and the cores 163 are placed to surround almost all the circumferences of the round rotor 166 except for the moving range of the heads 130 and 131. From the requirements of the magnetic characteristics of these, the yoke 161 and the cores 163 are formed of, for example, a silicon steel plate that is expensive in comparison to a galvanized sheet iron to form the chassis 101 and so forth.

However, in this type of disk drive, there has been an unremitting demand for reducing the production cost thereof, and still a strong demand for a smaller size and lighter weight of the drive.

Therefore, the inventor considers that there has been a demand for reducing the area of the yoke 161 and the cores 163 made of the expensive silicon steel plate, in the stator for the inner-rotor motor.

However, when the area of the yoke 161 and the cores 163 is reduced according to the foregoing demand, there has been found a possibility that the magnetic mutual effect to the rotor 166 becomes circumferentially nonuniform and the operational stability of the disk cannot be maintained accordingly.

Further, it is conceivable to divide the cores so as to have three yokes, in order to reduce the area of the cores 163. In this case, since the yokes each are placed in parallel, the spacings of the fronts each of the yokes become too narrow, and the coil winding cannot be performed, which is a problem.

SUMMARY OF THE INVENTION

The present invention has been made in view of the aforementioned circumstances, and the object of the invention is to achieve the following:

(a) reducing the production cost, (b) making the drive smaller and lighter, (c) maintaining the rotational stability of the motor, (d) enhancing the operational stability of the disk drive, (e) stepping up miniaturization of the stator.

According to one aspect of the invention, to accomplish the above object, the inner-rotor motor includes a rotor having plural magnetic poles disposed circumferentially, and a stator having a stator core with plural magnetic pole teeth facing to the rotor, located outside a circumference of the rotor, which have coils each wound around thereof.

In this construction, the coils are set such that the numbers of turns of adjacent coils are unequal, and respective sums of the numbers of turns of the coils in respective phases are equal.

In the invention, the windings of the coils may be set such that lengths of adjacent windings of the coils are unequal, and respective sums of the lengths of the windings corresponding to respective phases of the coils are equal.

In the invention, the coils may be placed such that at least one of points at which the extensions of lines connecting base end centers and front end centers of the adjacent coils intersect is positioned on an opposite side to the coils with regard to a rotational center of the rotor.

Further, in the invention, preferably the coils are arranged such that the base end centers of the adjacent coils are each placed with an equal spacing.

Further, in the invention, preferably the stator is placed within a central angel 180° with regard to a rotational center of the rotor.

Further, in the invention, preferably the stator is provided with six of the coils.

The disk drive of the invention may be configured with the aforementioned inner-rotor motor.

According to this invention, the coils of the stator is configured by setting the numbers of turns of adjacent coils to be unequal, and respective sums of the numbers of turns of the coils in respective phases to be equal. Thereby, even when the lengths of the magnetic pole teeth are made unequally because the spacings of the adjacent coils are reduced for miniaturization, the uniformity of drive in respective phases of the coils can be achieved, the decrease of torque can be prevented, and the effective drive and rotational stability of the rotor can be accomplished.

According to this invention, the windings of the coils are made up by setting the lengths of adjacent windings to be unequal, and respective sums of the lengths of the windings corresponding to respective phases of the coils to be equal. Thereby, it is possible to avoid a situation where the coil winding becomes impossible even when the spacings of the adjacent magnetic pole teeth become extremely small, and to achieve miniaturization of the coil portion with a constant thickness of the coils in the coil windings.

Here, the base end center represents the center position of a part where the magnetic pole teeth with the coil formed thereon is connected to the yoke in the circumferential direction of the rotor, and the front end center represents the center position of the rotor facing side of the magnetic pole teeth of the front of the coil in the circumferential direction of the rotor.

The coils according to the invention can be placed such that at least one of the points at which the extensions of the lines connecting the base end centers and front end centers of the adjacent coils intersect is positioned on the opposite side to the coils with regard to the rotational center of the rotor. Thereby, in correspondence with the front end centers of the coils arranged with an equal spacing along the circumference of the rotor, further miniaturization of the stator can be achieved, and also the spacing of the magnetic pole teeth can be set so as to make the coil winding possible.

Further, in the invention, the coils can be placed in a state that the base end centers of the adjacent coils are each set with an equal spacing. Thereby, the magnetic pole teeth can be placed symmetrically with the points at which the extensions of the lines connecting the base end centers and front end centers of the adjacent coils intersect. Thereby, in correspondence with the front end centers of the magnetic pole teeth arranged with an equal spacing along the circumference of the rotor, still further miniaturization of the stator can be achieved, and also the spacing of the magnetic pole teeth can be set so as to make the coil winding possible.

Further, the base end centers of the coils can be set with an equal distance from the point positioned on the opposite side to the coils with regard to the rotational center of the rotor. Thereby, the shape of the yoke where the magnetic pole teeth are connected can be made into a simple circle to reduce the production cost.

Further, according to the invention, since the stator is located within the central angel 180° with regard to the rotational center of the rotor, it becomes possible to reduce the area of the stator core less than about half, compared to the structure in which the stator is provided on the whole circumference of the rotor, such as a conventional inner-rotor motor. This construction reduces the cost of the stator core made of, for example, a silicon steel plate, and the cost of the coil winding and so forth, whereby the production cost of the inner-rotor motor can be cut down. Also, compared to the structure in which the stator is provided on the whole circumference of the rotor, it becomes possible to shrink the area for mounting the motor, to miniaturize the motor, and to lighten the motor by reducing the number of the magnetic pole teeth.

Further, the stator can take on a structure having a continuous central angel less than 180° with regard to the rotational center of the rotor, or the stator can be made up with plural stator portions with intervals in-between, where the total sum of the central angles of the stator portions is within 180°. And, since the stator can be placed within the central angel 90° with regard to the rotational center of the rotor, it becomes possible to achieve still further reduction of the production cost and the weight, and further miniaturization.

Further, since the stator is provided with six coils, the motor of the invention can be applied to the three-phase inner-rotor motor.

BRIEF DESCRIPTION OF THE DRAWINGS

Preferred embodiments of the present invention will be described in detail based on the followings, wherein:

FIG. 2A is a sectional view taken on line IIA—IIA of the inner-rotor motor in FIG. 1, and FIG. 2B is an enlarged sectional view illustrating the area near a magnet 25 in FIG. 2A;

DETAILED DESCRIPTION OF THE PREFERRED EMBODIMENTS

One embodiment of the inner-rotor motor and the disk drive relating to the invention will be described on the basis of the accompanying drawings.

Figure 1:
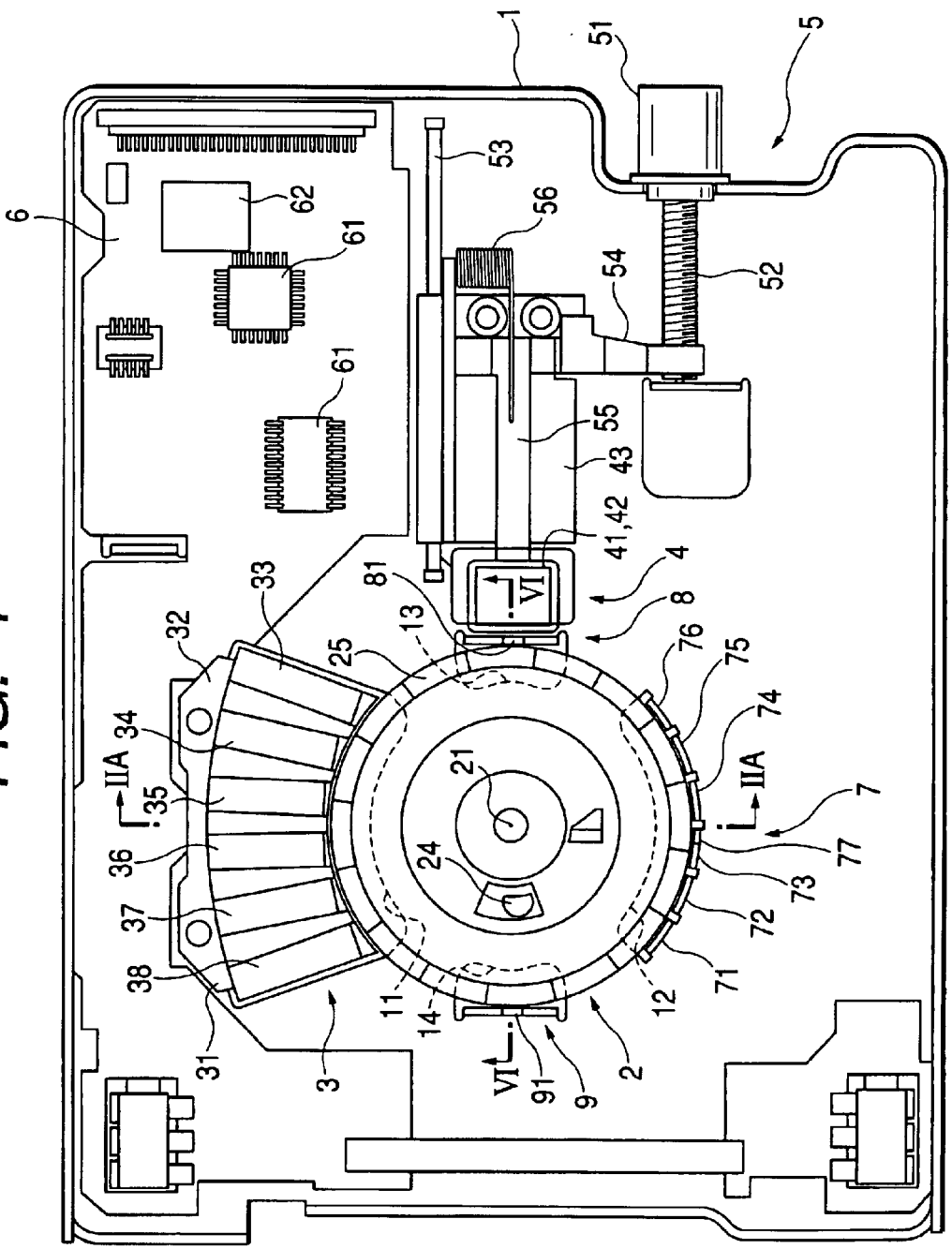
FIG. 1 is a plan view illustrating one embodiment of an inner-rotor motor and a disk drive relating to the invention.

FIG. 1 is a plan view illustrating a part of the disk drive of this embodiment. The symbol 1 in FIG. 1 signifies a chassis that forms a part of the case of the disk drive.

The disk drive of this embodiment is one example of a drive used as a floppy disk drive (FDD).

The chassis 1 made of a galvanized sheet iron mounts, as shown in FIG. 1, a rotor 2 and a stator 3 in the inner-rotor motor that rotates a magnetic recording media (disk), a magnetic head 4 that reads/writes a magnetic signal from/to the disk, a position controller 5 that controls the position of the magnetic head 4, a control board 6 that controls the drive of the inner-rotor motor, a magnetic balancer 7, a magnetic shield 8, and a magnetic balancer 9.

FIG. 2A is a sectional view taken on line IIA—IIA of the inner-rotor motor in FIG. 1, and FIG. 2B is an enlarged sectional view illustrating the area near a magnet 25 in FIG. 2A.

The rotor 2 is composed of, as shown in FIG. 1 and FIG. 2, a circular plate 23, an engagement projection 24, and the magnet 25. The circular plate 23 is supported by ball bearings 22, 22 and so forth to be able to rotate about a rotational center 21 of the spindle fixed to the bottom of the chassis 1, along a plane parallel to the bottom of the chassis 1. The engagement projection 24 projects out over the circular plate 23 and engages with an engagement hole of a floppy disk to transmit a rotational drive force. And, the magnet 25 is arranged along the rim of the circular plate 23 with a constant thickness, which is polarized to form plural magnetic poles circumferentially.

Figure 5:
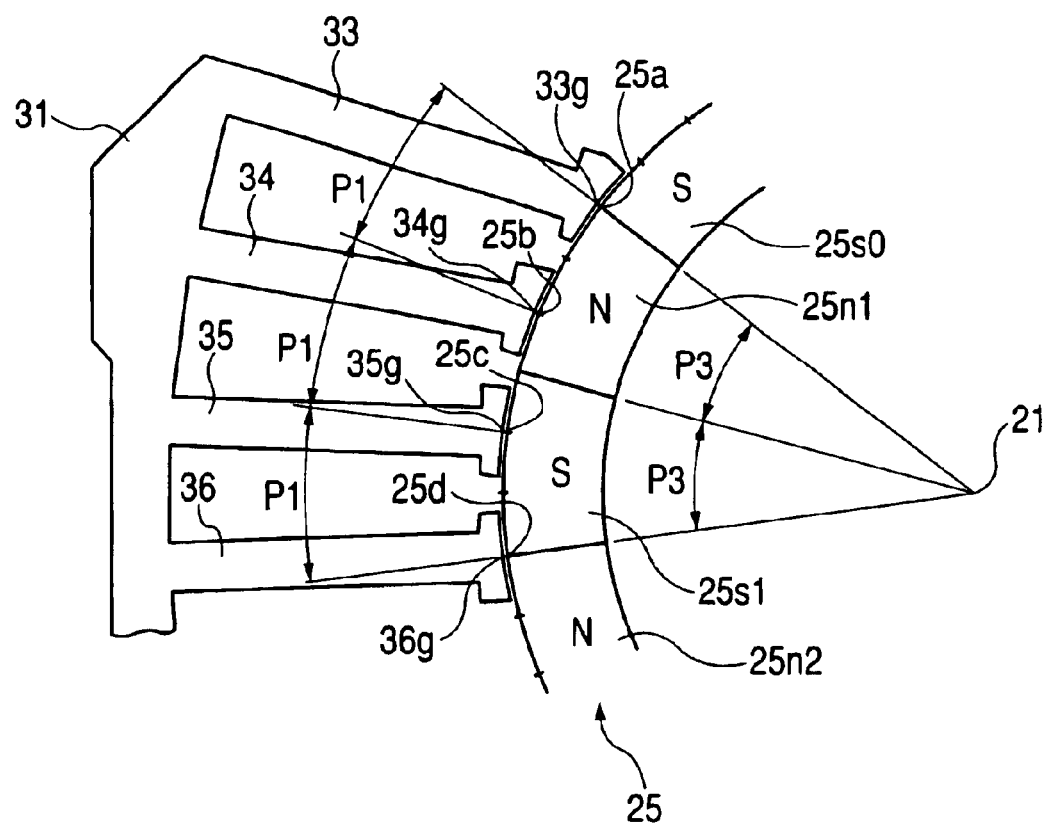
FIG. 5 is a typical plan view illustrating the relation between the magnet 25 and magnetic pole teeth 33 to 38 in FIG. 1.

As shown in FIG. 1 and FIG. 5, the magnet 25 has north poles and south poles arrayed circumferentially alternately. The total number of these magnetic poles is specified as 16 poles, for example. That is, magnetic poles 25n, 25s . . . are alternately arrayed every 22.5° with regard to the rotational center 21.

Figure 3:
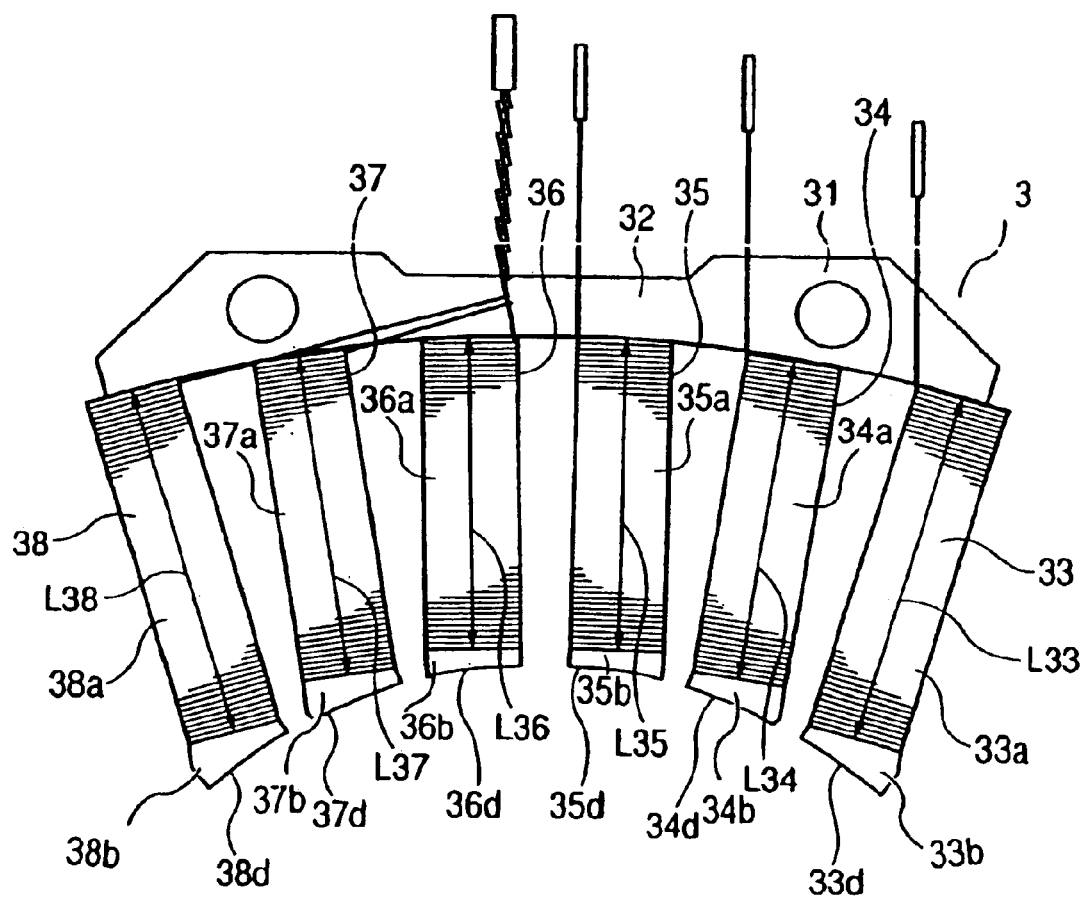
FIG. 3 is a plan view illustrating a stator 3 in FIG. 1.

FIG. 3 is a plan view illustrating the stator 3 in FIG. 1.

As shown in FIG. 1, FIG. 2, and FIG. 3, the stator 3 includes a yoke 32, and a stator core 31 composed of six magnetic pole teeth 33, 34, 35, 36, 37, 38 that are coupled by this yoke 32. And, coils are wound up on each of the magnetic pole teeth 33 to 38 to form coils 33a to 38a. The stator 3 is mounted on the chassis 1 by the yoke 32. The coils 33a to 38a are positioned so as to correspond to a cut-out 11 of the chassis 1, and the cut-out 11 is furnished on the area covering from a lower rotating position of the rotor 2 to the side thereof.

The cut-out 11 is made up with a shape from a position where the stator core 31 is mounted on the chassis 1 to the lower rotating position of the magnet 25 of the rotor 2, inside which the coils 33a to 38a can be contained. The shape of the cut-out 11 is set in consideration of the strength of the chassis 1 and the positional relation with cut-outs 12, 13, 14, in such a manner that the coils 33a to 38a can be housed, which will be described later.

The contour shape of the cut-out 11 at the lower rotating position of the rotor 2 is set to be symmetrical to the contour shape of the cut-out 12 at the lower rotating position of the rotor 2, with regard to the rotational center 21. Along with the setting of this shape, setting the shapes of the stator core 31 and the magnetic balancer 7 will make it possible to set the downward thrust acting on the rotor 2 by the magnetic flux from the magnet 25 falling into the bottom of the chassis 1, in the linear direction passing through the stator 3 and the magnetic balancer 7.

Similarly, in the cut-outs 13 and 14, each of the contour shapes at the lower rotating positions of the rotor 2 is set to be symmetrical with regard to the rotational center 21. Along with the setting of this shape, setting the shapes of the magnetic shield 8 described later and the magnetic balancer 9 will make it possible to set the downward thrust acting on the rotor 2 by the magnetic flux from the magnet 25 falling into the bottom of the chassis 1, in the linear direction passing through the magnetic shield 8 and the magnetic balancer 9.

Next, the shape of the stator core 31 will be described.

Figure 4:
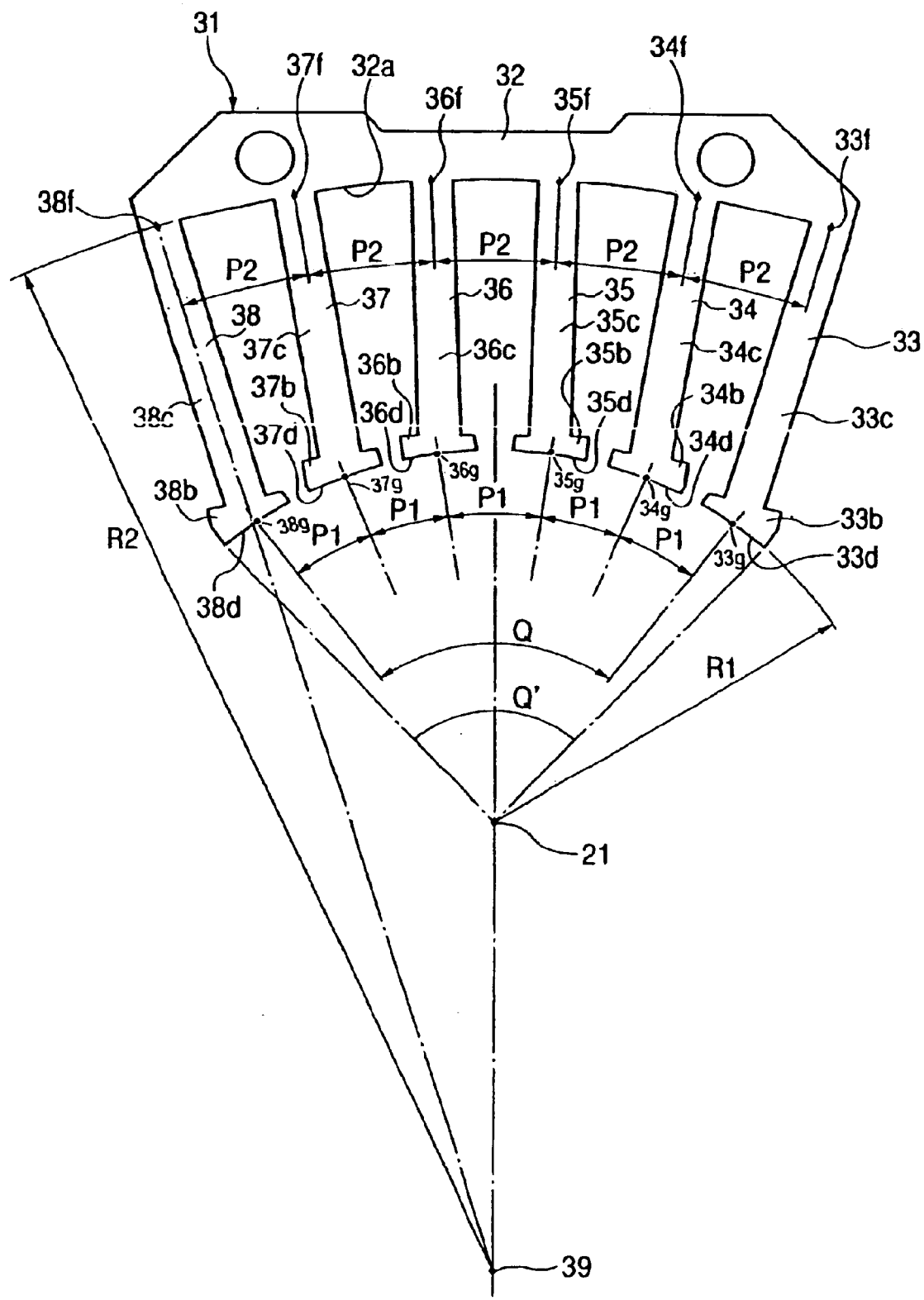
FIG. 4 is a plan view illustrating a stator core 31 in FIG. 1.

FIG. 4 is a plan view illustrating the stator core 31 in FIG. 1.

The stator core 31 is made of a silicon steel plate. As shown in FIG. 1 to FIG. 4, the magnetic pole teeth 33 to 38 are each made up with fronts 33b to 38b extending toward the rotor 2 from the coils 33a to 38a, and windings 33c to 38c on which the coils 33a to 38a are wound.

The windings 33c to 38c have a set uniform width across the entire length thereof. The fronts 33b to 38b each are formed wider than the windings 33c to 38c each. The fronts 33b to 38b each have rotor facing sides 33d to 38d each that face the magnet 25 of the rotor 2 with a substantially equal spacing, which are formed in an arc shape in the plan view.

In the stator core 31, each of the fronts 33b to 38b of the magnetic pole teeth is placed lower than the magnet 25 of the rotor 2, as shown in FIG. 2. The vertical center position of each of the fronts 33b to 38b is positioned lower than the vertical center position of the magnet 25, and is closer to the bottom of the chassis 1. At the same time, the coils 33a to 38a are placed inside the cut-out 11 of the chassis 1.

The setting of the displacement between the vertical center position of the fronts 33b to 38b and that of the magnet 25 is performed in such a manner that the downward thrust loading (toward the chassis 1) can maintain the rotational stability of the rotor 2, along with the setting of the height of the magnetic balancer 7, which will be described latter.

In the magnetic pole teeth 33 to 38, as shown in FIG. 1, FIG. 3, FIG. 4, and FIG. 5, the rotor facing sides 33d to 38d formed in the arc of radius R1 are placed with an equal distance from the rotational center 21 of the rotor 2, on the plan view. The pitches P1 each of the rotor facing sides 33d to 38d in the circumferential direction are set equal. The pitch P1 of the rotor facing sides 33d to 38d is the spacing between adjacent central positions 33g to 38g of the rotor facing sides 33d to 38d in the circumferential direction, which is given by the angle at the rotational center 21. The pitch P1 of the rotor facing sides 33d to 38d is set to, for example, 150.

That is, the value Q that the spacing between the circumferential center positions of the rotor facing side 33d and rotor facing side 38d positioned on both sides is expressed by the angle at the rotational center 21 is set to 75° in the central angle at the rotational center 21 of the rotor 2.

In the yoke 32, the side to which the magnetic pole teeth 33 to 38 each are connected, namely, the side 32a on the opposite side of the rotor 2, is formed into an arc on the plan view. As illustrated in FIG. 4, the side 32a is formed into the arc of radius R2 with a point 39 as the center that is more distant from the stator 3 than the rotational center 21 of the rotor 2. The magnetic pole teeth 33 to 38 have base end centers 33f through 38f that are adjacent to the yoke 32 and front end centers 33g through 38g (also referred to as the circumferential central positions 33g through 38g) that are adjacent to the rotor 2. At the same time, base end centers 33f and 38f of the magnetic pole teeth 33 and 38 connected to this side 32a are each set at the positions of an equal distance from the rotational center 21. The base end centers 34f and 37f of the magnetic pole teeth 34 and 37 are each set at the positions of an equal distance from the rotational center 21. The base end centers 35f and 36f of the magnetic pole teeth 35 and 36 are each set at the positions of an equal distance from the rotational center 21. That is, the shape of the stator core 31 is formed in the line symmetry to the line L that passes through the rotational center 21 and the point 39.

And, as shown in FIG. 4, in the magnetic pole teeth 33 to 38, the pitches P2 of the base end centers 33f to 38f are set equal to each other. The pitch P2 of the base end centers 33f to 38f is the spacing between the adjacent central positions in the circumferential direction along the side 32a in the base ends of the adjacent magnetic pole teeth 33 to 38, which is given by the angle at the point 39. The pitch P2 of the base end centers 33f to 38f is set to, for example, 7°, which is smaller than the pitch P1 of the rotor facing sides 33d to 38d.

In other words, the pitch P2 of the base end centers 33f to 38f is set in such a manner that at least one of the angles formed by adjacent two lines in the directions that the adjacent magnetic pole teeth 33 to 38 extend becomes smaller than the angle formed by adjacent two of the lines that connect the rotor facing sides 33d to 38d of the magnetic pole teeth 33 to 38 with the rotational center 21 of the rotor 2. That is, in each of the magnetic pole teeth 33 to 38, at least one angle P2 of the angles formed at the point 39 where the lines that each connect the base end centers 33f to 38f with the circumferential central positions 33g to 38g of the rotor facing sides 33d to 38d meet is set smaller than the angle P1 formed by adjacent two of the lines that connect the circumferential central positions 33g to 38g of the rotor facing sides 33d to 38d with the rotational center 21.

Here, the point 39 is set at a position existing outside the rotor 2.

Further, the windings 33c to 38c each are formed with an equal width in the extending direction of the magnetic pole teeth 33 to 38, as shown in FIG. 4, so as to extend on the lines passing through the base end centers 33f to 38f and the point 39. FIG. 4 illustrates the relation between the winding 38c of the magnetic pole teeth 38 and the line that passes through the base end center 38c and the point 39.

When the pitches P1 and P2 are set in this manner, the length L33 to L35 and the length L36 to L38, which are the lengths of the windings 33c of the magnetic pole teeth 33 to 38 are set each differently. That is, as shown in FIG. 3 and FIG. 4, the length L33 of the winding 33c is set longer than the length L34 of the winding 34c, and the length L34 of the winding 34c is set longer than the length L35 of the winding 35c. And, the length L33 of the winding 33c is set equal to the length L38 of the winding 38c, and the length L34 of the winding 34c is set equal to the length L37 of the winding 37, and the length L35 of the winding 35c is set equal to the length L36 of the winding 36c. In other words, the lengths are set to meet the following relation.

$$L33=L38>L34=L37>L35=L36$$

In the coils 33a to 38a, the number of turns N33 to N35 and the number of N36 to N38 of the winding are set each differently. These numbers of turns N33 to N38 can be set in proportion to the lengths L33 to L38 of the windings 33c to 38c. For example, the number of turn N33 is set larger than the number of turn N34, and the number of turn N34 is set larger than the number of turn N35. And, the number of turn N33 is set equal to the number of turn N38, the number of turn N34 is set equal to the number of turn N37, and the number of turn N35 is set equal to the number of turn N36. In other words, the numbers of the turns N33 to N38 are set to meet the following relation.

$$N33=N38 \geq N34=N37 \geq N35=N36$$

Further, in the coils 33a to 38a, the winding is made to correspond to the three phases (U-phase, V-phase, W-phase) in correspondence with the rotor 2 made up with 16 poles. The coil 33a is set to the U-phase, the coil 34a to the W-phase, and the coil 35a to the V-phase. The coil 36a is set to the U-phase, the coil 37a to the W-phase, and the coil 38a to the V-phase.

Therefore, the sum Nu of the number of turns of the U-phase is equal to N33+N36, the sum Nv of the number of turns of the V-phase is equal to N35+N38, and the sum Nw of the number of turns of the W-phase is equal to N34+N37, each of which is set equal. That is, the number of turns is set to meet the following.

$$Nu=Nw=Nv$$

Thereby, the torques of the three phases (U-phase, V-phase, W-phase) to the rotor 2 can be set equal.

With the construction as mentioned above, the stator 3 may be set within the central angel Q 180° with regard to the rotational center 21 of the rotor 2, on one side of the rotor 2, that is, on a plane parallel to the plane of rotation of the rotor 2, or it can further be set within the central angel Q 90°.

Thus, the possibility of setting the stator 3 within the central angel Q 180° will reduce the area of the stator core to less than about half, compared to the case in which the stator is provided on the whole circumference of the rotor 2, which is desirable. The possibility of setting the stator 3 within the central angel Q 90° will further reduce the area of the stator core, which is still more desirable.

FIG. 5 is a typical plan view illustrating the relation between the magnet 25 and the magnetic pole teeth 33 to 38 in FIG. 1.

The stator 3 and the rotor 2 are positioned such that the rotor facing sides 33d to 38d face to the rotor 2, as shown in FIG. 5. The relation between the magnetic pole teeth 33 to 38 each and the magnet 25 is set as follows.

As described above, in the circumferential direction of the rotor 2, the magnetic poles 25n, 25s . . . are arranged by the pitch of 22.5° with regard to the rotational center 21. This pitch is represented by P3 in FIG. 5. On the other hand, as already mentioned, the pitch P1 of the rotor facing sides 33d to 38d in the circumferential direction is set to 15° as an example. That is, each one of the magnetic poles 25n, 25s . . . of the rotor 2 corresponds to one tooth of the magnetic pole teeth 33 and a half of the magnetic pole teeth 34, namely, 1.5 teeth of the magnetic pole teeth 33 to 38. The magnetic pole teeth 37, 38 are omitted in the drawing.

That is, as shown in FIG. 5, the magnetic poles in the stator 3 and the rotor 2 are arranged in such a manner that, when the circumferential central position (front center) 33g of the rotor facing side 33d of the magnetic pole teeth 33 is at a position corresponding to a border position 25a between the magnetic pole 25s0 and the magnetic pole 25n1, the next circumferential central position 34g of the rotor facing side 34d of the magnetic pole teeth 34 comes to a position corresponding to the second position 25b from the side of the magnetic pole 25s0, acquired by dividing the pitch P3 of the magnetic pole 25n1 circumferentially into three. Also, the next circumferential central position 35g of the rotor facing side 35d of the magnetic pole teeth 35 comes to a position corresponding to the first position 25c from the side of the magnetic pole 25n1, acquired by dividing the pitch P3 of the magnetic pole 25s1 circumferentially into three. Also, the next circumferential central position 36g of the rotor facing side 36d of the magnetic pole teeth 36 comes to a position corresponding to a border position 25d between the next magnetic pole 25s1 and the next magnetic pole 25n2.

Here, the shapes of the stator 3 and the rotor 2 in the three-phase motor will be explained.

Figure 7:
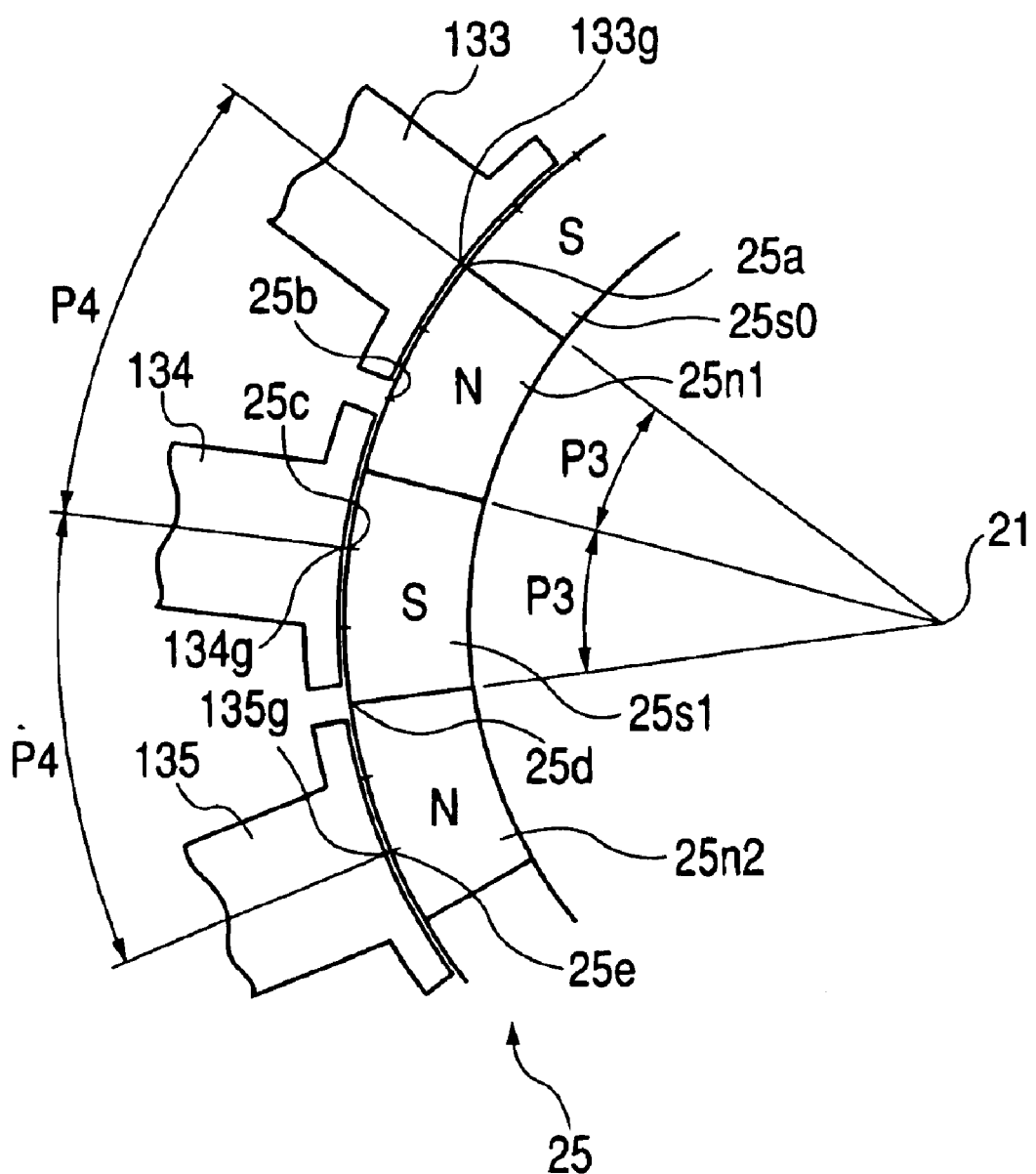
FIG. 7 is a typical plan view illustrating the relation between the magnet 25 and magnetic pole teeth 133 to 136 in a conventional motor.

FIG. 7 is a typical plan view illustrating the relation between the magnet 25 and magnetic pole teeth 133 to 136 in a conventional motor. Here, the magnetic pole teeth are illustrated only for three for simplification, and the others are omitted. The magnet 25 assumes the same structure as the embodiment shown in FIG. 5. The same components are given the same symbols, and the explanations will be omitted.

In the conventional three-phase inner-rotor motor illustrated in FIG. 7, with regard to the electric angle set to a pair of magnetic poles 25n, 25s of the rotor as 360°, the U-phase, V-phase, W-phase are each set such that the arrangements of the magnetic pole teeth 133, 134, 135 each have the phase difference of the electric angle 120°.

Concretely, in the same manner as in FIG. 5, with regard to the magnet 25, when the circumferential central position 133g of the rotor facing side of the magnetic pole teeth 133 is at a position corresponding to the border position 25a between the magnetic pole 25s0 and the magnetic pole 25n1, the circumferential central position 134g of the rotor facing side of the magnetic pole teeth 134 comes to a position corresponding to the first position 25c from the side of the magnetic pole 25n1, acquired by dividing the pitch P3 of the magnetic pole 25s1 circumferentially into three. Also, the circumferential central position 135g of the rotor facing side of the magnetic pole teeth 135 comes to a position corresponding to the second position 25e from the side of the magnetic pole 25s1, acquired by dividing the pitch P3 of the magnetic pole 25n2 circumferentially into three.

Thus, in the conventional three-phase inner-rotor motor illustrated in FIG. 7, three magnetic pole teeth 133, 134, 135 are arranged about the rotational center 21 with the pitch P4 of 30°, for example. That is, when the magnetic pole teeth are arranged on the whole circumference of the rotor 2 with the same pitch P4, the stator is to have 12 magnetic poles.

In contrast to this, in the inner-rotor motor of this embodiment, the U-phase, V-phase, W-phase are each set such that the arrangements of the magnetic pole teeth 133, 134, 135 each have the phase difference of the electric angle 120°, in which the coil 33a comes into the U-phase, coil 34a into W-phase, coil 35a into V-phase, coil 36a into U-phase, coil 37a into W-phase, and coil 38a into V-phase.

Further, the pitch P1 of the rotor facing sides 33d to 38d in the magnetic pole teeth 33 to 38 is set to 15°, for example. Accordingly, in this embodiment, when the magnetic pole teeth are arranged on the whole circumference of the rotor 2 with this pitch P1, the stator is to have 24 magnetic poles.

Therefore, in this embodiment, the number of the magnetic pole teeth arranged in the central angle to the rotational center 21 per unit angle is set larger than the number of the magnetic poles of the rotor 2. In other words, in this embodiment, the angle density of the magnetic pole teeth 33 to 38 in the central angle to the rotational center 21 is set higher than the angle density of the magnetic poles 25n, 25s of the rotor 2. In reverse, in the conventional three-phase inner-rotor motor as illustrated in FIG. 7, in the central angle to the rotational center 21, the number of the magnetic pole teeth arranged per unit angle is set smaller than the number of the magnetic poles of the rotor. That is, in the conventional three-phase inner-rotor motor as illustrated in FIG. 7, the angle density of the magnetic pole teeth 133 to 138 in the central angle to the rotational center 21 is set lower than the angle density of the magnetic poles 25n, 25s of the rotor.

Therefore, in the conventional three-phase inner-rotor motor as illustrated in FIG. 7, in order to set six magnetic pole teeth, for example, the angle range of 120° becomes necessary, as the central angle at the rotational center 21 of the rotor 2, which requires as large an area as that for the stator.

Further, when the magnetic pole teeth 133, 134, 135 are set on the lines passing through the rotational center 21 and the circumferential central positions 133g, 134g, 145g, more of the circumferential length of the yoke becomes necessary unlike the case where the magnetic pole teeth are set on a straight line that passes on the point 39 at a position farther from the stator 3 than the rotational center 21 as in this embodiment. As the result, the area of the yoke on the plan view cannot be reduced, accordingly the area of the stator core 31 cannot be reduced sufficiently.

The magnetic balancer 7 is installed at a position opposite to the stator 3 with the rotor 2 intervening between, in order to attain the magnetic balance with the stator 3 in regard to the rotor 2.

A plurality of the magnetic balancers 7 are arranged around the circumference of the rotor 2, to face to the circumference of the magnet 25 of the rotor 2, as shown in FIG. 1 and FIG. 2. The plural balancer 7 are bent upright from the bottom of the chassis 1, which are formed integrally with the bottom of the chassis 1, adjacently to the cut-out 12 formed at the lower rotating position of the rotor 2 of the chassis 1.

The magnetic balancer 7 is composed of six magnetic balancer portions 71 to 76 corresponding to the rotor facing sides 33d to 38d of the stator 3. These portions are arrayed in a manner that each of rotor facing sides 71a to 76a of these portions is in the point symmetry with each of the rotor facing sides 33d to 38d of the magnetic pole teeth 33 to 38 with regard to the rotational center 21 of the rotor 2.

That is, the magnetic balancer portion 71 is placed in a manner that the rotor facing side 71a comes to a symmetrical position with the rotor facing side 33d with regard to the rotational center 21. The magnetic balancer portion 72 is placed in a manner that the rotor facing side 72a comes to a symmetrical position with the rotor facing side 34d with regard to the rotational center 21. Similarly, the other balancer portions are placed in a manner that the rotor facing side 73a and the rotor facing side 35d, the rotor facing side 74a and the rotor facing side 36d, the rotor facing side 75a and the rotor facing side 37d, and the rotor facing side 76a and the rotor facing side 38d are each symmetrical with regard to the rotational center 21.

This construction of the magnetic balancer portions intends to balance the magnetic influence given to the rotor 2 from the stator 3 by the shape of the magnetic balancer 7, and to maintain the symmetry of the magnetic balance to the rotor 2 with regard to the rotational center 21.

Concretely, the rotor facing sides 71a to 76a are set in an arc shape of radius R1' to be in an equal distance from the rotational center 21 of the rotor 2. This radius R1' is set larger than the radius R1 set to the rotor facing sides 33d to 38d, which is determined in consideration of the height of the magnetic balancer 7. The pitches of these rotor facing sides 71a to 76a each are set equal, for example, 15°, which is the same as the pitch P1 of the rotor facing sides 33d to 38d.

And, the circumferential length of the rotor facing sides 71a to 76a is set to correspond to the length of the rotor facing sides 33d to 38d of the magnetic pole teeth 33 to 38 with regard to the rotational center 21.

That is, in the magnetic balancer portion 71, the circumferential length of the rotor facing side 71a is set equal to the circumferential length of the rotor facing side 33d; and in the magnetic balancer portion 72, the circumferential length of the rotor facing side 72a is set equal to the circumferential length of the rotor facing side 34d. Similarly, in the magnetic balancer portion 73, the circumferential length of the rotor facing side 73a is set equal to the circumferential length of the rotor facing side 35d; and in the magnetic balancer portion 74, the circumferential length of the rotor facing side 74a is set equal to the circumferential length of the rotor facing side 36d. And, in the magnetic balancer portion 75, the circumferential length of the rotor facing side 75a is set equal to the circumferential length of the rotor facing side 37d; and in the magnetic balancer portion 76, the circumferential length of the rotor facing side 76a is set equal to the circumferential length of the rotor facing side 38d.

The magnetic balancer 7 is set at a lower position than that of the rotor 2. In other words, the vertical center position of the magnetic balancer 7 is set at a lower position than the center position in the rotational axis direction of the magnet 25 of the rotor 2. And, the heights of the magnetic balancer portions 71 to 76 are set substantially equal, and are set lower than the height of an upper side 26 of the magnet 25 of the rotor 2. In other words, the upper ends 71b to 76b of the magnetic balancer 7 are set to come closer to the bottom of the chassis 1 than the upper side 26 of the magnet 25 of the rotor 2.

The setting of the difference between the height of the upper ends 71b to 76b of the magnetic balancer portions 71 to 76 and that of the upper side 26 of the magnet 25 is performed in such a manner that the downward thrust loading (toward the chassis 1) can maintain the rotational stability of the rotor 2, in cooperation with the setting of the displacement between the vertical center position of the fronts 33b to 38b and that of the magnet 25.

Here, the method of setting the shape of the magnetic balancer 7 will be described.

As shown in FIG. 2B, a force F3 acts between the rotor 2 and the stator 3, and a force F7 acts between the rotor 2 and the magnetic balancer 7. The force F3 is to act slant downward to the bottom of the chassis 1 rather than to the plane of rotation of the rotor 2. The reason is that the force F3 acts on the rotor 2 in the direction of the fronts 33b to 38b placed lower than the magnet 25 of the rotor 2. Also, the force F7 is to act slant downward to the bottom of the chassis 1 rather than to the plane of rotation of the rotor 2. The reason is that the force F7 acts on the rotor 2 in the direction of the magnetic balancer 7 placed lower than the magnet 25 of the rotor 2.

Here, the force F3 and force F7 cause the rotor 2 to produce torques in regard to the bearings 22, 22. In order to attain the rotational stability without the rotor 2 slanting, the force F3 and force F7 need to satisfy the next expression (1).

$$F7t \cdot (RA-RB) < F3t \cdot (RA+RB)$$

$$F3t \cdot (RA-RB) < F7t \cdot (RA+RB) \qquad (1)$$

Here, as shown in FIG. 2A and FIG. 2B,

F3t=F3 cos $\theta_1$ (vertical component of F3)

F7t=F7 cos $\theta_2$ (vertical component of F7)

RA: radius of the circumference of the magnet 25 to the rotational center 21

RB: turning radius of the bearing 22 to the rotational center 21.

With the expression (1) satisfied, the force F3 and force F7 become able to apply the thrust for stabilizing the rotation of the rotor 2 to the rotor 2 by the sum of the force F3t and force F7t, in the axial direction of the rotor 2. That is, the rotor 2 is pressed to the bottom of the chassis 1 from the periphery thereof.

Here, between the cut-out 11 and the cut-out 14, between the cut-out 14 and the cut-out 12, between the cut-out 12 and the cut-out 13, between the cut-out 13 and the cut-out 11, the magnetic fluxes each fall into the bottom of the chassis 1, and thereby the downward thrust acts on the rotor 2.

Therefore, the force F3 and force F7 are to be set in such a manner that the downward force to the rotor 2 achieves the rotational stability of the rotor 2, and that the downward force comes to such a degree that the frictions and so forth by the increase of the thrust on the rotational axis of the rotor 2 do not influence the drive performance to be retarded.

And in the force F3 and force F7, the force F7p is set greater than the force F3p in a direction perpendicular to the rotational axis of the rotor 2, that is, in a direction parallel to the bottom of the chassis 1. Concretely, as shown in FIG. 2B, the force F3p facing left is set smaller than the force F7p facing right. Thus, a force F2 facing right as shown in FIG. 2B, that is, the force facing from the stator 3 to the magnetic balancer 7 is applied to the rotational axis 21 of the rotor 2 to attain the stability of the rotational axis of the rotor 2.

As the parameters to set the force F3 and force F7 as mentioned above, the followings can be listed.

Areas of the rotor facing sides 33d to 38d

Distance between the rotor facing sides 33d to 38d and the circumference of the magnet 25

Vertical positions of the rotor facing sides 33d to 38d and the magnet 25

Areas of the rotor facing sides 71a to 76a

Distance between the rotor facing sides 71a to 76a and the circumference of the magnet 25

Vertical positions of the rotor facing sides 71a to 76a and the magnet 25.

To set the forces by combining these parameters will achieve an optimum condition.

The magnetic head 4 includes a first head 41 and a second head 42 placed up and down that reads/writes a magnetic signal from/to a disk, which is mounted on a head carriage 43. The position controller 5 controls the position of the first head 41 and the second head 42.

The position controller 5 contains a stepping motor 51 for feeding the head carriage 43, as shown in FIG. 1. The stepping motor 51 is retained on the rear center of the chassis 1, and functions as a driving source that drives the head carriage 43 forward and backward. A lead screw 52 with a helical V-letter groove functions as the output axis of the stepping motor 51. The front of the lead screw 52 is supported by a bearing. In parallel to the lead screw 52, a guide bar 53 is retained on the rear center of the chassis 1 so as to guide the head carriage 43 described later forward and backward.

The head carriage 43 possesses a needle bar 54 projecting slant backward, and a plate spring that presses the needle bar 54 on the V-letter groove of the lead screw 52. The head carriage 43 is supported freely movable by the guide bar 53, which is installed on the upper part of the chassis 1. The head carriage 43 retains the magnetic head 41 for reading recorded information on a disk on the front part thereof, and a head arm 55. The head arm 55 holds the magnetic head 42 that matches with the magnetic head 41, which is mounted to freely swing by way of an elastic member on the rear upper part of the head carriage 43. The head arm 55 is energized by a torsion spring 56 to swing in the direction that the magnetic head 42 approaches to the magnetic head 41. The torsion spring 56 has a stopper to restrict the swing of the arm on one end thereof, which is furnished integrally therewith.

On the control board 6 are mounted chips 61, 61 as a controller that performs the drive control of the position controller 5 and the inner-rotor motor, and a capacitor 62, and so forth.

The magnetic shield 8 is provided on the side of the magnetic head 4 of the rotor 2, which shields the magnetic fluxes from the magnet 25 to the magnetic heads 41, 42.

Figure 6:
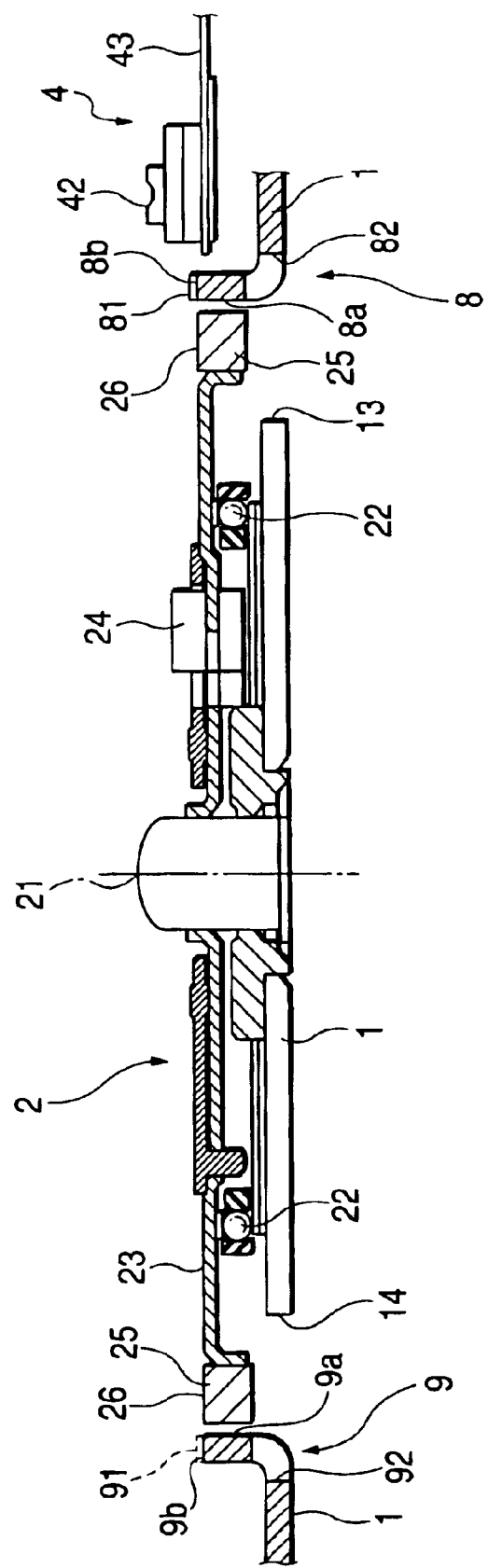
FIG. 6 is a sectional view taken on line VI—VI, illustrating a magnetic shield of the inner-rotor motor in FIG. 1.

FIG. 6 is a sectional view taken on line VI—VI, which illustrates the magnetic shield of the inner-rotor motor in FIG. 1.

The magnetic shield 8 is placed around the circumference of the rotor 2, to face to the circumference of the magnet 25 of the rotor 2, as shown in FIG. 1 and FIG. 6. The magnetic shield 8 is bent upright from the bottom of the chassis 1, which is formed integrally with the bottom of the chassis 1, adjacently to the cut-out 13 formed at the lower rotating position of the rotor 2 on the chassis 1.

The magnetic shield 8 is formed linearly on the plan view, and the length thereof is set to an extent that conceals the magnet 25 of the rotor 2, when the rotor 2 is viewed from the magnetic head 42. In other words, it suffices for a length that can shield the magnetic fluxes from the magnet 25 so as not to have an effect on the operations of the magnetic heads 41, 42.

The linearly formed magnetic shield 8 is located such that it approaches to the rotor 2 most at the center thereof; and the distance between a rotor facing side 8a thereof and the magnet 25 is the shortest at the center and longer on both ends of the magnetic shield 8.

Thereby, even if the length of the magnetic shield 8 is different from a length equivalent to the two adjacent magnetic poles 25n, 25s of the magnet 25 illustrated in FIG. 5, it is possible to prevent the magnetic fluxes that fall on the magnetic shield 8 from the magnet 25 of the rotating rotor 2 from increasing or decreasing sharply. Accordingly, it is possible to make the magnetic fluxes vary gradually to the maximum, which prevents cogging from being generated. Therefore, the detent torque of the rotor 2 can be reduced.

Here, as the optimum length of the magnetic shield 8 for preventing the generation of cogging, a length is conceivable that is substantially equal to the length of the two adjoining magnetic poles 25n, 25s of the magnet 25 illustrated in FIG. 5. However, if this length is set as the length substantially equal to the length of the two adjoining magnetic poles 25n, 25s of the magnet 25 illustrated in FIG. 5, the size of the cut-out 13 will become increased against the length of the magnetic shield 8. Accordingly, the strength of the chassis 1 will possibly be lowered.

Therefore, in order to shorten the length of the magnetic shield 8 in comparison to the length of the two adjoining magnetic poles 25n, 25s of the magnet 25, while preventing the generation of cogging and maintaining the strength of the chassis 1, it is necessary to set the distance between the rotor facing side 8a of the magnetic shield 8 and the periphery of the rotor 2 so as to increase and decrease gently. Thereby, the generation of cogging can be prevented without lowering the strength of the chassis 1.

An upper end 8b of the magnetic shield 8 is set to be substantially flush with the upper side 26 of the magnet 25, as shown in FIG. 6. Here, the vertical size of the rotor facing side 8a is set substantially equal to the vertical size of the magnet 25. This construction will shield the magnetic fluxes from the magnet 25, and will prevent the magnetic fluxes from the magnet 25 from giving an influence to the operation of the magnetic head 42. The shape of the magnetic shield 8 is set so as to stretch the magnet 25 only horizontally, which reduces the normal load added on the rotor 2.

That is, by setting the shape of this part, it becomes possible to set the normal load added on the rotor 2.

The magnetic balancer 9 is formed at a position opposite to the magnetic shield 8 with the rotor 2 intervening between, in order to attain the magnetic balance with the magnetic shield 8 with regard to the rotor 2.

The magnetic balancer 9 is located around the outer periphery of the rotor 2, to face to the circumference of the magnet 25 of the rotor 2, as shown in FIG. 1 and FIG. 6. The magnetic balancer 9 is bent upright from the bottom of the chassis 1, which is formed integrally with the bottom of the chassis 1, adjacently to the cut-out 14 formed at the lower rotating position of the rotor 2 on the chassis 1.

The magnetic balancer 9 is made up in correspondence with the magnetic shield 8, and is located in the point symmetry with the magnetic shield 8 with regard to the rotational center 21 of the rotor 2.

That is, the length of the linearly formed magnetic balancer 9 is set equal to that of the magnetic shield 8. And, the position in regard to the magnet 25 of the rotor 2 is set such that the magnetic balancer 9 approaches to the rotor 2 most at the center thereof, in the same manner as the magnetic shield 8. And, the distance between a rotor facing side 9a thereof and the magnet 25 is the shortest at the center and longer on both ends of the magnetic balancer 9.

An upper end 9b of the magnetic balancer 9 is set to be flush with the upper side 26 of the magnet 25 of the rotor 2, as shown in FIG. 6. And, the vertical size of the rotor facing side 9a is set equal to, or larger than the vertical size of the magnet 25, which is the same as the rotor facing side 8a of the magnetic shield 8.

Further, in forming the magnetic shield 8 and the magnetic balancer 9 by press-bending the bases of the magnetic shield 8 and the magnetic balancer 9, the press bending processing can give a stress to the bases on the chassis 1; accordingly, through holes 82, 92 are formed on the bases of the chassis 1 in order to avoid the stress that exerts a harmful influence to the bottom of the chassis 1.

Thus, the shape of the magnetic balancer 9 is made in the point symmetry with the magnetic shield 8 with regard to the rotational center 21 of the rotor 2, and thereby the magnetic influence from the magnetic shield 8 to the rotor 2 can be balanced, and the magnetic balance to the rotor 2 can be maintained to be symmetrical with regard to the rotational center 21.

The magnetic balancer 7, the magnetic shield 8, the magnetic balancer 9 are furnished on the upper ends 73b, 8b and 9b thereof with convex cartridge supports 77, 81, 91 that project above the upper side 26 of the magnet 25 of the rotor 2, as shown in FIG. 1, FIG. 2, and FIG. 6. These cartridge supports 77, 81, 91 are provided to support a disk cartridge in a manner that the disk cartridge does not come into contact with the rotational parts of the rotor 2, even if the disk cartridge of a floppy disk or the like is deformed thermally. Therefore, the heights of the upper ends of the cartridge supports 77, 81, 91 are set so as not to obstruct the rotational operation of a disk on the rotor 2, and also not to obstruct the rotation of the rotor 2 by the cartridge.

In the inner-rotor motor and the disk drive of this embodiment, the stator 3 is located within the central angel Q 180° with regard to the rotational center 21 of the rotor 2 on one side of the rotor 2, on a plane parallel to the plane of rotation of the rotor 2, more desirably it is located within the central angel Q 90°. This construction makes it possible to reduce the area of the stator core less than about half, compared to the structure in which the stator is provided on the whole circumference of the rotor 2 such as a conventional inner-rotor motor, which reduces the cost of the stator core made of, for example, a silicon steel plate, and the cost of the coil winding and so forth, whereby the production cost of the inner-rotor motor can be cut down.

At the same time, compared to the conventional construction in which the stator is provided on the whole circumference of the rotor 2, the area necessary for the motor installation can be reduced, the size can be made smaller, the number of teeth can be decreased; and therefore, the motor can be made lighter.

In the disk drive of this embodiment, the area necessary for the motor installation can be reduced, the size can be made smaller, the number of teeth can be decreased; and therefore, the drive can be made lighter.

In the inner-rotor motor and the disk drive of this embodiment, since the magnetic balancer 7 for attaining the magnetic balance with the stator 3 with regard to the rotor 2 is provided on the outer periphery of the rotor 2, even if the rotor 2 is driven in a state that the stator 3 is placed only on one side of the rotor 2, the force acting on the rotor 2 can be well balanced in a symmetry with the rotational axis of the rotor 2, which makes it possible to sufficiently attain the rotational stability of the rotor 2.

The magnetic balancer 7 of this embodiment is bent upright from the bottom of the chassis 1, which is formed integrally with the bottom of the chassis 1, adjacently to the cut-out 12 formed at the lower rotating position of the rotor 2 on the chassis 1. Thereby, in the production of the chassis 1 made of a galvanized sheet iron, for example, bending the lower rotating position of the rotor 2 for the cut-out 12 up to the mounting side of the rotor 2 by the press punching will form the magnetic balancer 7 and the chassis 1 at the same time. This construction permits simplification of the production process, economy in the material cost, and reduction of the production cost, compared with the case where another member is mounted as the balancer 7.

Since the magnetic balancer 7 of this embodiment is composed of plural magnetic balancer portions 71 to 76 divided along the circumference of the rotor 2, as mentioned above, it is possible to prevent deformations on the bottom of the chassis 1, and to enhance facility of processing, during bending up the chassis 1 made of a galvanized sheet iron, for example, in forming the rotor facing sides 71a to 76a as the curve corresponding to the circumference of the rotor 2. Further, in setting the magnetic balance with the magnetic pole teeth 33 to 38 separately provided along the circumference of the rotor 2, it is possible to easily realize the magnetic symmetry with the magnetic pole teeth 33 to 38 in the arrangements of the magnetic balancer portions 71 to 76.

In the magnetic balancer 7 of this embodiment, the configuration of the magnetic balancer portions 71 to 76 and the configuration of the rotor facing sides 33d to 38d of the magnetic pole teeth 33 to 38 are set to be symmetrical with regard to the rotational center 21 of the rotor 2, and the sum of the lengths that the rotor facing sides 71a to 76a occupy to the circumference of the magnet 25 is set equal to the sum of the lengths that the rotor facing sides 33d to 38d of the magnetic pole teeth 33 to 38 occupy to the circumference of the magnet 25; and thereby, it becomes still easier to symmetrically set the effects that the magnetic balancer 7 and the stator 3 exert on the rotor 2, with regard to the rotational center 21 of the rotor 2.

In the magnetic balancer portion 71 of the balancer 7, the rotor facing side 71a is disposed at a symmetrical position with the rotor facing side 33d with regard to the rotational center 21, and the circumferential length of the rotor facing side 71a is set equal to the circumferential length of the rotor facing side 33d; in the magnetic balancer portion 72, the rotor facing side 72a is disposed at a symmetrical position with the rotor facing side 34d with regard to the rotational center 21, and the circumferential length of the rotor facing side 72a is set equal to the circumferential length of the rotor facing side 34d; and in the same manner, in the magnetic balancer portion 73, the rotor facing side 73a is disposed at a symmetrical position with the rotor facing side 35d with regard to the rotational center 21, and the circumferential length of the rotor facing side 73a is set equal to the circumferential length of the rotor facing side 35d; in the magnetic balancer portion 74, the rotor facing side 74a is disposed at a symmetrical position with the rotor facing side 36d with regard to the rotational center 21, and the circumferential length of the rotor facing side 74a is set equal to the circumferential length of the rotor facing side 36d; in the magnetic balancer portion 75, the rotor facing side 75a is disposed at a symmetrical position with the rotor facing side 37 with regard to the rotational center 21, and the circumferential length of the rotor facing side 75a is set equal to the circumferential length of the rotor facing side 37d; and in the magnetic balancer portion 76, the rotor facing side 76a is disposed at a symmetrical position with the rotor facing side 38d with regard to the rotational center 21, and the circumferential length of the rotor facing side 76a is set equal to the circumferential length of the rotor facing side 38d. This construction will make it still easier to symmetrically set the effects that the magnetic balancer 7 and of the magnetic pole teeth 33 to 38 exert on the rotor 2, on the design of the magnetic circuit.

Further, in this embodiment, the magnetic balancer 7, the magnetic shield 8, and the magnetic balancer 9 each possess separate structures, as mentioned above. However, as shown in FIG. 8, it is possible to make a structure including a magnetic balancer 80 serving also as the magnetic shield, and a magnetic balancer 90 serving also as the magnetic balancer to the magnetic shield.

Figure 8:
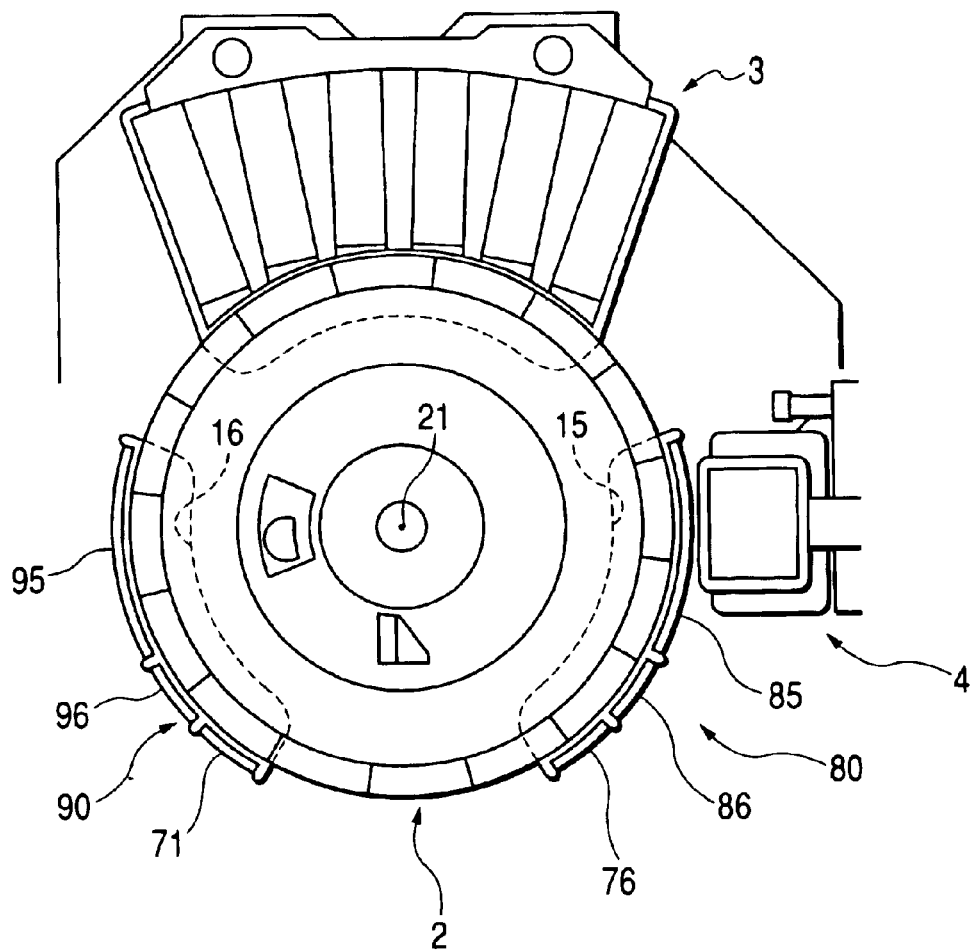
FIG. 8 is a plan view illustrating another embodiment of the magnetic shield and the magnetic balancer relating to the invention.

Here, as shown in FIG. 8, the magnetic balancer 80 is bent upright from the bottom of the chassis 1, which is formed integrally with the bottom of the chassis 1, adjacently to the cut-out 15 formed at the lower rotating position of the rotor 2 on the chassis 1; and, the magnetic balancer 80 is placed around the outer periphery of the rotor 2 so as to face to the circumference of the magnet 25 of the rotor 2.

The magnetic balancer 80 are composed of plural portions, including a magnetic shield portion 85 provided to correspond to the magnetic head 4, and magnetic balancer portions 86, 76 provided adjacently to the magnetic shield portion 85.

The circumferential length of the magnetic shield portion 85 is set equal to a length corresponding to the two adjacent magnetic poles 25n, 25s of the magnet 25, whereby cogging will not be generated.

The magnetic balancer 90 is provided at a position opposite to the magnetic balancer 80 with the rotor 2 intervening between, in order to attain the magnetic balance with the magnetic balancer 80 with regard to the rotor 2.

The magnetic balancer 90 is located around the outer periphery of the rotor 2, to face to the circumference of the magnet 25 of the rotor 2, as shown in FIG. 8. The magnetic balancer 90 is bent upright from the bottom of the chassis 1, which is formed integrally with the bottom of the chassis 1, adjacently to the cut-out 16 formed at the lower rotating position of the rotor 2 on the chassis 1.

The magnetic balancer 90 is made up in correspondence with the magnetic balancer 80, which includes a magnetic balancer portion 95 located in the point symmetry with the magnetic shield 85 with regard to the rotational center 21 of the rotor 2.

That is, the length of the magnetic balancer portion 95 is set equal to that of the magnetic shield portion 85, and the position with regard to the magnet 25 of the rotor 2 is set to be the same as the magnetic shield portion 85.

The magnetic balancers 80 and 90 are disposed to attain the magnetic balance with the stator 3 with regard to the rotor 2, with the magnetic influences of both composed.

Here, the spacing between the cut-out 15 and the cut-out 16 is set larger than the spacing between the cut-out 12 and the cut-out 13, or the spacing between the cut-out 12 and the cut-out 14; accordingly, the magnetic fluxes from the magnet 25 fall much more on the chassis 1, and the downward thrust acting on the rotor 2 becomes larger. Therefore, the upper ends of the magnetic balancers 80, 90 are to be set at a higher position than the upper end of the magnetic balancer 7.

Figure 9:
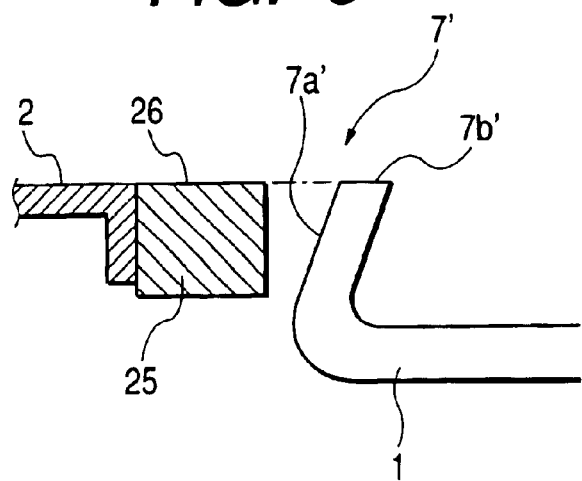
FIG. 9 is a sectional view illustrating another embodiment of the magnetic balancer relating to the invention.
Figure 10:
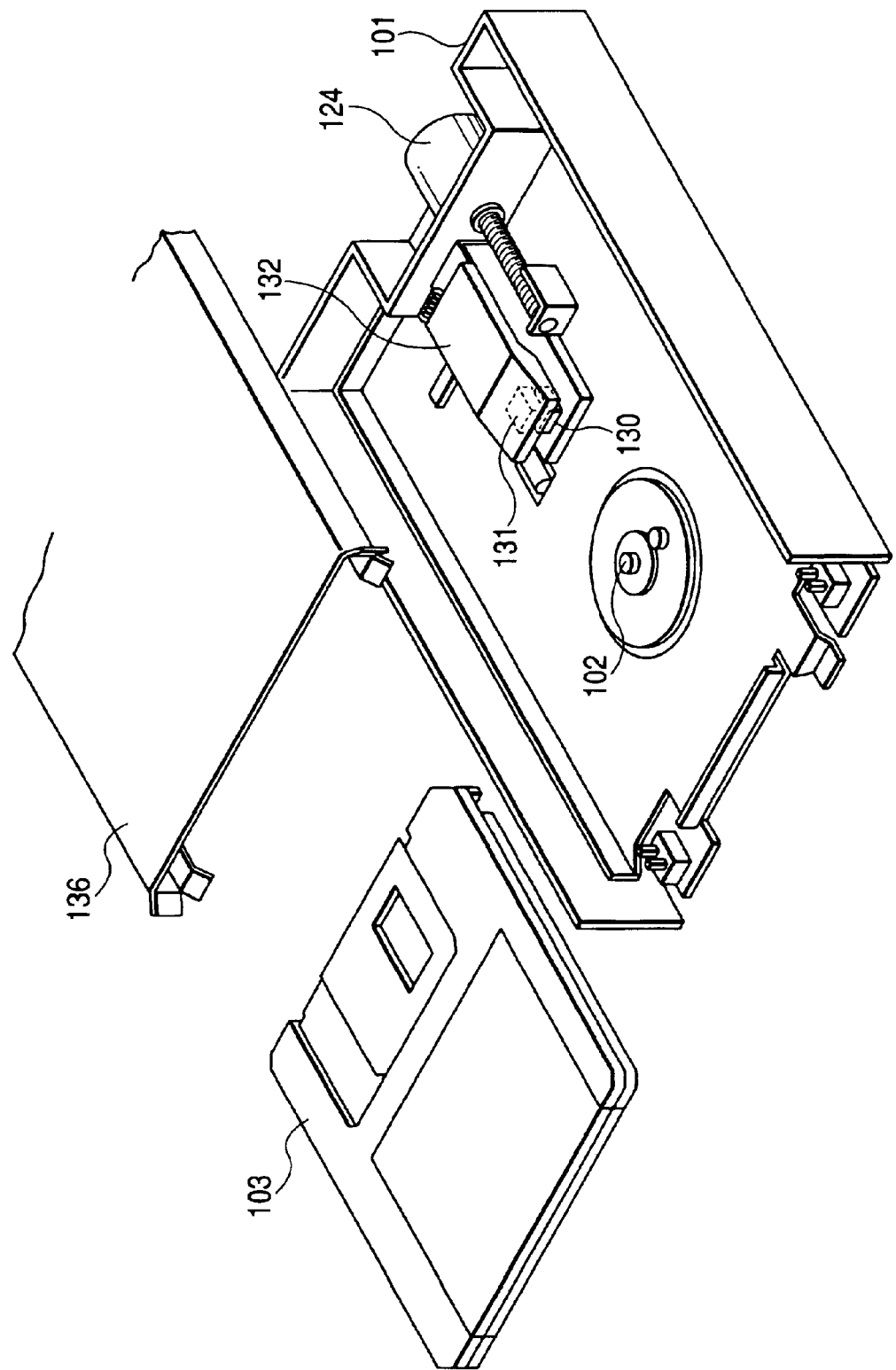
FIG. 10 is a typical perspective view illustrating a conventional disk drive.
Figure 11A:
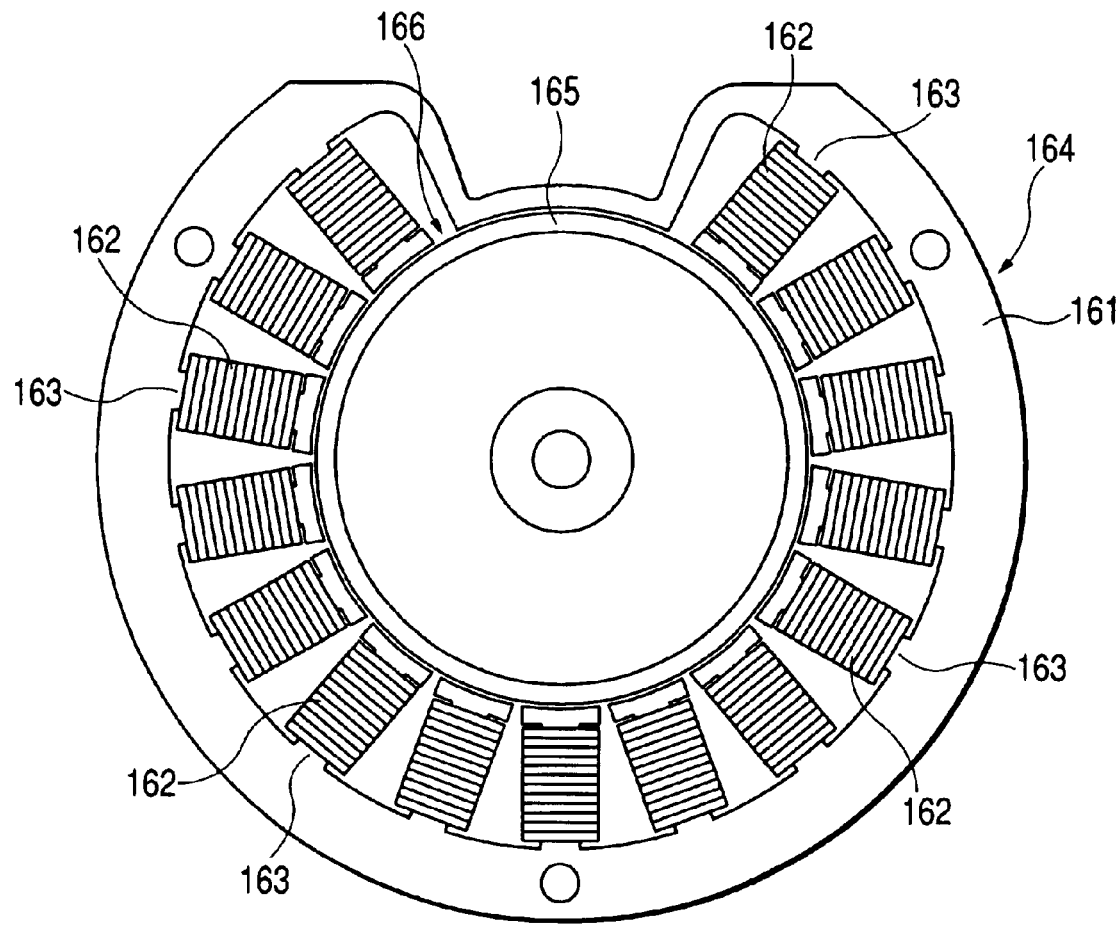
FIG. 11A is a plan view illustrating a conventional inner-rotor motor.
Figure 11B:
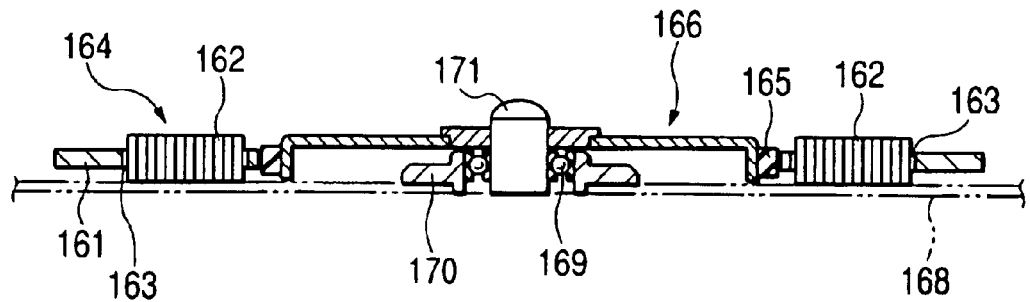
FIG. 11B is a sectional view thereof.

And, as a structure that a slant downward force, as the force F7 illustrated in FIG. 2B, acts between the rotor 2 and the magnetic balancer 7, as shown in FIG. 9, a magnetic balancer 7' is possible, in which an upper end 7b' thereof is flush with the upper side 26 of the magnet 25 of the rotor 2, and a rotor facing side 7a' is inclined from the base end toward the front, in a direction to separate from the outer periphery of the rotor 2. Since the distance between the rotor facing side 7a' and the outer periphery of the magnet 25 decreases from the upper the lower, a slant downward force is to act between the rotor and the magnetic balancer 7'.

What is claimed is:

1. An inner-rotor motor comprising:

a rotor having plural magnetic poles disposed circumferentially; and a stator having a yoke and a stator core including plural magnetic pole teeth that are coupled by the yoke and face the rotor, the magnetic pole teeth having coils each wound around thereof, the coils having base end centers adjacent to the yoke and front end centers adjacent to the rotor, at least one of points at which extensions of lines connecting the base end centers and the front end centers of the adjacent coils intersect is positioned on an opposite side to the coils with regard to a rotational center of the rotor, and wherein numbers of turns of adjacent coils are unequal, and respective sums of the numbers of turns of the coils in respective phases are equal.

2. An inner-rotor motor according to claim 1, wherein lengths of adjacent windings of the coils are unequal, and respective sums of the lengths of the windings corresponding to respective phases of the coils are equal.

3. An inner-rotor motor according to claim 1, wherein the base end centers of the adjacent coils are placed with an equal spacing.

4. An inner-rotor motor according to claim 1, wherein the stator is placed within a central angel 180° with regard to a rotational center of the rotor.

5. An inner-rotor motor according to claim 1, wherein the stator is provided with six of the coils.

6. A disk drive comprising the inner-rotor motor according to claim 1.

* * * * *